United States Patent [19]

Pugsley et al.

[11] Patent Number: 4,629,874
[45] Date of Patent: Dec. 16, 1986

[54] PREPAYMENT METERING SYSTEM

[75] Inventors: Peter C. Pugsley, Middlesex; Rowland A. G. Dunkley, Bedford, both of England

[73] Assignee: The De La Rue Company PLC, Maidenhead, England

[21] Appl. No.: 686,794

[22] Filed: Dec. 26, 1984

[30] Foreign Application Priority Data

Jan. 12, 1984 [GB] United Kingdom ............... 8400809

[51] Int. Cl.⁴ ............................................. G06K 5/00
[52] U.S. Cl. ..................................................... 235/380
[58] Field of Search ......................................... 235/380

[56] References Cited

U.S. PATENT DOCUMENTS 4,212,919 8/1978 Ogon ............................... 235/380 X Primary Examiner—Harold I. Pitts
Attorney, Agent, or Firm—Sughrue, Mion, Zinn, Macpeak and Seas

[57] ABSTRACT

This invention concerns a prepayment metering system using a card on which information may be stored and from which stored information may be erased. In one form, a number (A) recorded on the card is read at the meter and stored (30) in preparation for the next card insertion. To obtain a further credit at the meter, the card is taken to a terminal station (12) at which the number (A) recorded on the card is read and is subjected to an encryption process under the control of a key and the resulting number (A') is recorded on the card in place of the previous number (A). On the next insertion of the card at the meter (21), the number (A') is read from the card and subjected to a decryption step (22) using the same key, the result of the decryption being compared with the number stored in the register (30) and in the event of a match a credit is issued. In another embodiment, the terminal generates a random number which is subjected to encryption and both the random number and the result of the encryption are recorded on the card and subsequently used at the meter.

15 Claims, 2 Drawing Figures

4,629,874

PREPAYMENT METERING SYSTEM

BACKGROUND OF THE INVENTION

This invention relates to a prepayment metering system for services such as electricity, gas and water.

It is usual for meters to be read by an official from the supply company from time to time to enable a charge to be computed, or for a consumer to put coins or tokens into a meter as prepayment for units of electricity, gas or water, the coins or tokens being collected at intervals by an inspector. The requirement for an inspector to call at the consumer premises from time to time is an onerous one, particularly in cases where a consumer is rarely at home. Ways of avoiding such visits have therefore been considered and solutions have been proposed such as generating at a terminal station a signal identifying a particular meter and sending this signal over electricity supply lines, the meter including a recognition circuit which, on receipt of its identification signal, triggers a meter reading device which then sends a signal representing the reading back along the supply lines to the terminal station. However, such systems are expensive in the equipment required at the consumer premises.

SUMMARY OF THE INVENTION

According to the present invention, a prepayment metering system for use with a card having a recording medium of the kind permitting recording and erasure of information comprises a terminal station having means for receiving the card, means for reading a first number recorded on the card, encryption means utilising the first number to obtain a second number, and recording means for recording the second number on the card in place of the first number; and further comprising a meter having means for receiving the card, means for reading the said second number from the card, a store in which is stored the first number, read from the card during its previous insertion in the meter, means for carrying out a comparison step involving a complementary decryption process or the same encryption process and utilising the second number read from the card and the first number stored in the meter, and means for registering a credit if the comparison is successful, the meter then replacing the first number in its store by the second number read from the card in preparation for the next card insertion. In one embodiment the first number read from the card at the terminal station is itself encrypted using a key stored in the terminal station to provide the second number to be recorded on the card in place of the first number. At the meter, the second number read from the card is subjected to a decryption process utilising a key stored in the meter, which corresponds to the key stored in the terminal station, and is then compared with the said first number stored in the meter.

One encryption algorithm which can be used is that known as the Data Encryption Standard (DES), Federal Information Processing Standard No. 46, published on Jan. 15, 1977 (U.S. National Bureau of Standards). This algorithm enables a 64-bit plain-text word to be converted using a 56-bit key to a 64-bit cipher text and vice versa. In a simple system, a fixed key for use in the algorithm is stored in the meter and at the terminal. At the terminal, the number read from the card is encrypted using the DES algorithm and the fixed key, and recorded on the card in place of the number read from the card. At the meter, the number read from the card is decrypted using the DES algorithm and the fixed key and is compared with the number stored when the card was last inserted; if the numbers match, a unit of credit is registered and the number now recorded on the card is stored in the meter is place of the previously stored number.

A preferred and more secure system utilises the encrypted meter number in the encryption and decryption processes. In this preferred system, the meter number is stored on the card and the terminal stores a master key by means of which the meter number is encrypted, the resulting number being then used as the key for the encryption of the first-mentioned number stored on the card, which encryption provides the new number to be recorded on the card in place of the first-mentioned number. At the meter, this new number is decrypted by means of a number which is the result of encrypting the meter number using the master key, and the output of the decryption circuit is compared with the number stored in the meter at the time of the last card insertion. As indicated above, if a unit of credit is registered the number stored in the meter from the last card insertion is replaced by the number now read from the card.

It is desirable in such a system to compare the meter number recorded on the card with the meter number recorded in the meter itself, and to issue a credit only if this comparison also shows matching numbers.

In another embodiment of the invention, the terminal station includes means for generating a third number, the recording means at the terminal station also recording the said third number on the card. The encryption means at the terminal station encrypts this third number using, as at least a part of the key, the said first number read from the card to obtain the second number to be recorded on the card in place of the first number. At the meter the said second number read from the card is subjected to a decryption process utilising as at least a part of the key the first number stored in the meter, and the decrypted number is compared with the third number, which is read from the card by the meter.

The means for generating the third number is preferably a random number generator. In this system, the key used for the encryption and decryption processes at the terminal station and meter may additionally include a fixed key or a key derived by encrypting the meter number with a master key, the meter number being then recorded on the card. Again, it is preferred to compare the meter number recorded on the card with the meter number in the meter itself, and to issue a credit only if this comparison indicates a match, in addition to the match between the above-mentioned compared numbers.

The invention also consists in a meter for use in a system of the kind described above and in a terminal station for use in such a system.

BRIEF DESCRIPTION OF THE DRAWINGS

In order that the invention may be better understood, examples of systems embodying the invention will now be described with reference to the accompanying drawings, in which.

DESCRIPTION OF THE PREFERRED EMBODIMENT

In the systems, it will be assumed that the DES encryption algorithm is used. Using this algorithm, a 64-bit plain text P at the input of a DES encryption circuit controlled by a 56-bit key results in a 64-bit cypher text at the output; similarly, the cypher text can be reconverted to the plain text using the same chip in decryption mode and the same 56-bit key. Because the algorithm is very complex, the possible number of keys is very large and deduction of the key is not possible, even if a large number of messages in plain text and cypher text are known.

Figure 1:
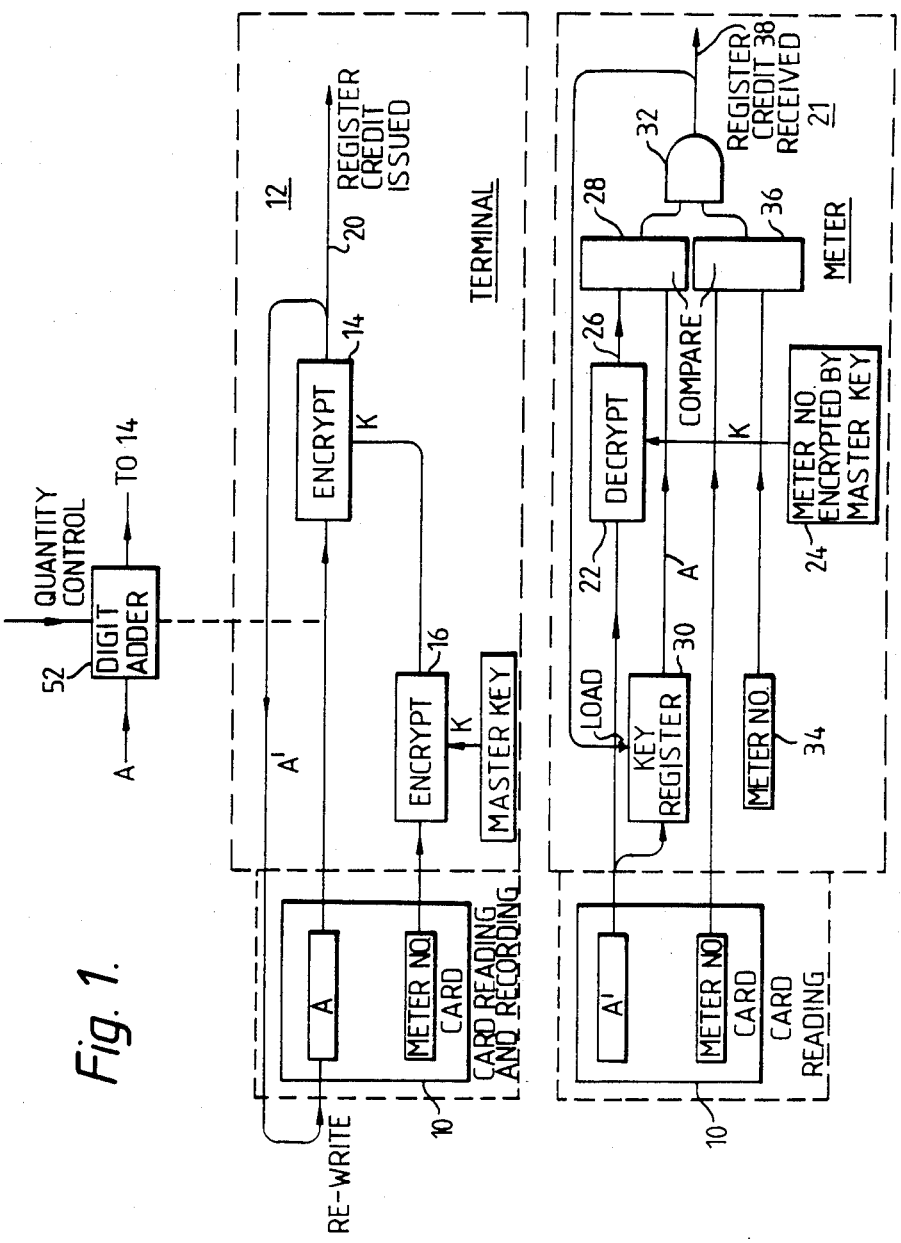
FIG. 1 shows a first system involving recording two numbers on the card.

In FIG. 1, a card 10 having recorded thereon a first number A and a meter number, is shown in two different positions in the upper and lower diagrams. In the upper diagram, the card is plugged into the terminal station 12 at which a reading device reads the number A and applies it to a DES encrypt circuit 14, the key for which is derived as follows. The terminal station also reads the meter number from the card and applies it to a DES encrypt circuit 16, controlled by a master key stored in a register 18. The result of encrypting the meter number under the control of the master key provides the key for the encryption of the number A. The result of this encryption is recorded on the card as a new number A' in place of the number A which was recorded on the card prior to its insertion into the terminal. A signal on line 20 indicates that a register credit has been issued.

The DES encrypt circuit 14 may be of the kind known as a data cypher processor and sold under the number AMZ8068 by Advanced Micro Devices Inc. of 901, Thomson Place, P.O. Box 3453, Sunny Vale, Calif., 94088, U.S.A.

At the meter 21 the consumer inserts the card into the meter, where the new number A' is read and applied to a DES decryption circuit 22 under the control of a key from store 24, this key being the meter number encrypted by the master key. It is clear that such decryption is the reverse of the encryption process carried out in the terminal station, so that the output at line 26 will be the number A which existed on the card prior to its last insertion into the terminal station. This number is compared in a comparator 28 with a number derived from a key register 30, which stores the number A which it received from the card at the time of the last insertion of the card into the meter. If these two numbers coincide, a signal is applied from the comparator 28 to the AND gate 32.

At the same time, the meter number on the card 10 is read and compared with the meter number held in a store 34 in the meter, this comparison being carried out by the comparator 36. If the meter numbers match, a second input signal is applied to AND gate 32, resulting in an output signal on line 38 which registers a unit of credit in the meter. This output signal also causes the key register 30 to be loaded with the existing number A' on the card 10. In this way, the meter is prepared for the next alteration of number A when the card is next inserted at the terminal station. Thus each time the card is inserted at the meter, the meter by virtue of its decrypt circuit 22 and the new number in its register 30, is told what number to expect when the card is next inserted. A unit of credit will only be given if before this next insertion the card has been taken to the terminal station, at which the expected number will be recorded in place of the earlier number.

The card may be similar to a conventional credit card, with a magnetic stripe which is encoded at the time of purchase. The card is not retained in the meter, when inserted by the customer, and is not modified by the meter. Once it has been read, it merely activates the meter to allow consumption of the unit amount of electricity paid for. When this unit has been used up, the card has to be updated at the terminal before the meter will accept it a second time. Only the hardware in the terminal is able to produce the coded sequence of numbers which will be recognised by the meter and the terminal must read the old card to know what number A was left in the meter the last time the card was used so that it can generate the appropriate new number A' to put on the card.

The construction of the meter is such that even by taking a meter to pieces there is no way of deducing the master key upon which the security of the system depends.

Thus box 24, containing the meter number encrypted by the master key, is a PROM or hard-wired connection which contains the encrypted number. Even if the meter number and the encrypted number are known there is no way to deduce the master key.

Figure 2:
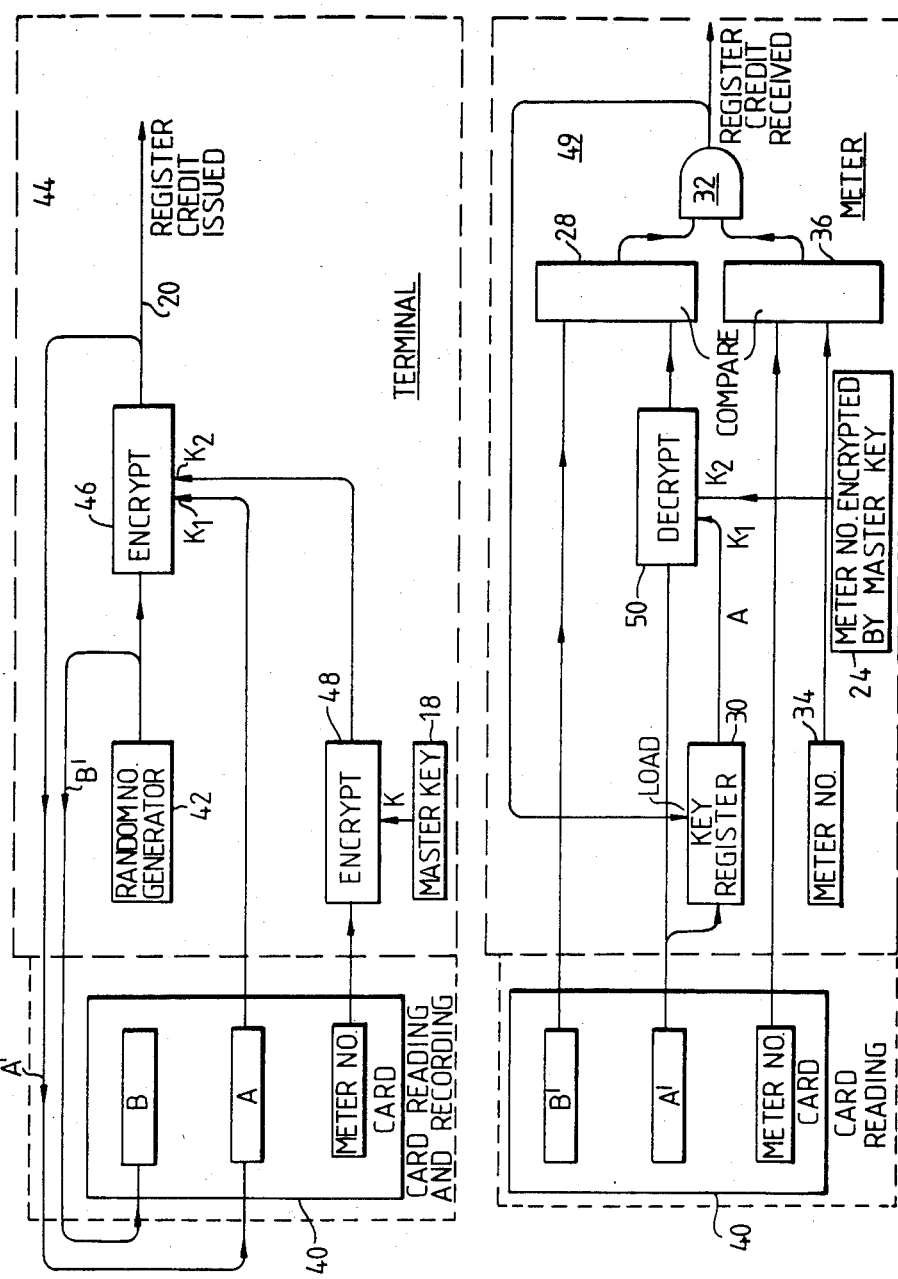
FIG. 2 shows a second system involving recording three numbers on a card.

The system shown in FIG. 2 is similar in principle to that shown in FIG. 1 but uses an additional random number generator to increase security and records three numbers on the card in place of two.

In this system, a card 40 has recorded thereon a number A, a number B and the meter number. When it is taken to the terminal station, the number B is disregarded and is replaced by a recording of another number B' derived from a random number generator 42 in the terminal 44. The number from the random number generator 42 is also applied to a DES encrypt circuit 46 controlled by keys K1 and K2. The key K1 is the number A read from the card 40. The key K2 is obtained by encrypting in circuit 48 the meter number read from the card using the DES algorithm under the control of the master key read from the store 18. The output of circuit 46 is used to write the new number A' on card 40 in place of the old number A and to indicate, on line 20, that a credit has been issued.

At the consumer's premises, when the card is inserted into the meter 49 the number B' is read and is applied directly to the comparator circuit 28. The number A' is read and is applied to a DES decrypt circuit 50 operating under the control of keys K1 and K2. Key K1 is derived from a key register 30 which stored the old number A when the card was last inserted into the meter. Key K2 is derived from the store 24, which stores the meter number encrypted by the master key.

The result of the decryption in circuit 50 is a number which is applied to the comparator 28.

As the number A' presently on the card was derived from encrypting the random number B' presently on the card in accordance with a key involving the preceding number A and the meter number, it is clear that the decryption of the new number A' by circuit 50 using the earlier value A from key register 30 and the encrypted meter number will result in the same random number that now constitutes number B' on the card. Consequently, a match should be obtained at the comparator 28, resulting in a first input signal to AND gate 32.

As before, the meter number on the card and the meter number in the store 34 in the meter are compared by circuit 36 to provide the second input to the AND gate 32.

If both inputs are present, the AND gate provides an output signal representing a unit of credit in the meter. At the same time, the output of the AND gate is used to cause the key register 30 to be loaded with the number A presently recorded on the card 40.

It is theoretically possible but undesirable in practice, to replace the decrypt circuit 22 in FIG. 1 by an encrypt circuit between the key register 30 and the comparator 28, and similarly to replace the decrypt circuit 50 of FIG. 2 by an encrypt circuit between the number B' and the comparator 28. However, these changes are undesirable since anyone taking the meter to pieces to obtain the encrypt circuit in a meter modified as just described, would have the basis of a terminal station, and the same would apply in the case of the similar modification for FIG. 2.

As the standard DES chip can both decrypt and encrypt, it is desirable to use in the meter a chip which would not be convertible and this can be obtained by a minor modification of the above-mentioned standard chip; this chip would perform a DES decryption operation under a fixed key which could not be deduced even by microscopic examination of the chip. Alternatively, for small quantities, it may be more appropriate to use a standard chip wired for decryption with the key, held in a RAM, mounted together in a secure box with some arrangement so that any attempt at opening the box would result in the key being lost.

Thus in FIG. 1 a secure mounting of boxes 22 and 24 could be employed so that memory is destroyed if the box is opened and for large quantities boxes 22 and 24 could be combined in a single chip. However in the configuration of FIG. 1 such precautions may not be necessary since even if the meter is fully dismantled only the meter number encrypted by the master key can be deduced, not the master key itself. This only enables the thief to counterfeit cards to operate the meter he has just dismantled; the counterfeit cards will not operate any other meter.

Similar arguments apply to FIG. 2.

Similar but less secure systems can be obtained by using fixed keys stored in the meter and terminal instead of using the meter number encrypted by the master key.

If desired, the system can be modified to enable different quantities of electricity, gas or water to be purchased. The adder 52 may be controlled by an operator, who keys in the number of units purchased, or by an automatic cash-receiving machine, or by a machine for receiving a card on which money available is recorded and from which the value of the credits may be debited by the machine. Thus, in FIG. 1 an adder 52 may be inserted where indicated by the dotted line to add digits representing 0, 1, 2 or 3 to cover the purchase of four different quantities of electricity. In the meter, a modification is made in the comparator 28; this modification is such that the comparator does not require equality between the two compared numbers, i.e. for the purpose of comparison it ignores the 0, 1, 2 or 3 which were added to the number A, and provided the other conditions are fulfilled it will activate the appropriate credit on the meter. Although this modification reduces security by a factor of 4, in that there is now a four-times greater chance of activating the meter by a randomly chosen number, the number of keys available in DES algorithm is so great that the difference in security is insignificant.

In a further modification, the terminal may be arranged to issue only a limited number of up-dates, after which it requires re-activation by a secret code known only to a branch manager, for instance. This would prevent continued use of a stolen terminal.

In another modification, more than one master key is "buried" in the chips at the terminal station, means being provided for activating a key change by a specially coded card in the event that the current master key becomes known.

If the card should be lost, there is a need for some means to bring a replacement card into step with the meter. For this purpose the meter may be provided with a numerical display which can be switched on to display the number in the key register. In a fully electronic meter this may be the same display normally used to register energy consumption or credit outstanding. If he has lost his card the customer is required to read the key register on the meter and report this number to the showroom where a new card can be issued. There is no loss of security in making the key register readable on the meter, as the data which it contains is only that which was read from the last card used.

It will be seen that the system described prevents re-use of a card, even by fraudulent replication of the card, and also does not require the expense of a writing device in the meter, such as would be required to cancel a credit recorded on the card. Also, the master key is not stored in the meter in a form in which it could be used to break the entire system.

What is claimed is:

1. A prepayment metering system for use with a card having a recording medium of the kind permitting recording and erasure of information, the system comprising a terminal station having:
   means for receiving the card;
   means for reading a first number (A) recorded on the card;
   encryption means utilising the first number (A) to obtain a second number (A');
   and recording means for recording the second number on the card in place of the first number;
   and further comprising a meter having:
   means for receiving the card;
   means for reading the said second number (A') from the card;
   a store in which is stored a number, obtained from the card during its previous insertion in the meter, and which is, or is derived from, the first number (A) stored on the card at the time of its previous insertion;
   means for carrying out a comparison step involving a complementary decryption process or the same encryption process and utilising the second number (A') read from the card and the first number (A) derived from the store in the meter;
   means for registering a credit if the comparison is successful;
   and means for replacing the number in the meter store by a new number which is, or is derived from, the number (A') read from the card, in preparation for the next card insertion.

2. A system in accordance with claim 1, in which the encryption means utilising the first number (A) uses for the encryption a key stored in the terminal station to provide the second number (A') to be recorded on the card in place of the first number.

3. A system in accordance with claim 2, in which the menas for carrying out the comparison step subjects the second number (A') read from the card at the meter to a decryption process utilising a key, stored in the meter, which corresponds to the key stored in the terminal station and compares the number resulting from the decryption with the said first number stored in the meter.

4. A system in accordance with claim 2 in which the means for carrying out the comparison step subjects the first number (A) stored in the meter to an encryption process using a key stored in the meter which corresponds to the key stored in the terminal station, and compares the number resulting from the encryption with the second number read from the card.

5. A system in accordance with claim 1, wherein the terminal station includes means for generating a third number (B), the recording means at the terminal station records the third number on the card, and the encryption means at the terminal station encrypts this third number (B) using as at least part of the key the said first number (A) read from the card to obtain the second number (A') to be recorded on the card in place of the first number, and wherein at the meter the means for carrying out the comparison step subjects the said second number read from the card (A') to a decryption process utilising as at least a part of the key the first number (A) stored in the meter, and compares the decrypted number with the third number (B), which is read from the card by the meter.

6. A system in accordance with claim 4, wherein the terminal station includes means for generating a third number (B), the recording means at the terminal station records the third number on the card, and the encryption means at the terminal station encrypts this third number (B) using as at least a part of the key the said first number (A) read from the card to obtain the second number (A') to be recorded on the card in place of the first number; and wherein at the meter the reading means reads both the third number (B) and the second number (A'), and the means for carrying out the comparison step subjects the third number (B) to an encryption process utilising as at least a part of the key the stored first number (A) and compares the encrypted number with the second number (A') read from the card.

7. A system in accordance with claim 1, for use with a card having the meter number recorded thereon, and comprising in the meter a store for the meter number, and means for comparing the meter number read from the card with the meter number stored in the meter and issuing a credit only if this comparison is also successful.

8. A system in accordance with claim 1, in which the meter number is recorded on the card, and in which the terminal station includes a store for a master key and encryption means for encrypting the meter number read from the card using the master key, and in which the result of the encryption is used as a key for the encryption of the number (A) read from the card.

9. A terminal in a system according to claim 1, including means for receiving a card of the kind having a recording medium permitting recording and erasure of information and for reading a number recorded on the card, means for encrypting a number in accordance with a key, and means for replacing the number on the card with the number resulting from the encryption.

10. A terminal in a system according to claim 6, and comprising a random number generator, with means for recording a random number generated thereby on the card and also recording on the card the result of encrypting the random number.

11. A meter in a system according to claim 1, comprising means for reading a number (A') from an inserted card; a storage register for storing the number read from the card; decryption (or encryption) and comparison means utilising the number (A') read from the card and the number (A) stored in the storage means and issuing a credit if the comparison is successful; and means operable following the comparison to read the number (A') from the card and to store it in the storage register in place of the number (A) previously stored.

12. A meter in a system according to claim 7 and having a meter number, comprising means for reading a number (A') from an inserted card; a storage register for storing the number read from the card; decryption (or encryption) and comparison means utilising the number (A') read from the card and the number (A) stored in the storage means and issuing a credit if the comparison is successful; and means operable following the comparison to read the number (A') from the card and to store it in the storage register in place of the number (A) previously stored; second comparison means connected to compare the meter number with a meter number read from the inserted card, and logic means for issuing a credit only if both comparisons are successful.

13. A meter in a system according to claim 6 and having a meter number, comprising means for reading a number (A') from an inserted card; a storage register for storing the number read from the card; decryption (or encryption) and comparison means utilising the number (A') read from the card and the number (A) stored in the storage means and issuing a credit if the comparison is successful; and means operable following the comparison to read the number (A') from the card and to store it in the storage register in place of the number (A) previously stored; and a store in which is recorded the result of encrypting the meter number with the master key.

14. A system in accordance with claim 1, further comprising at the terminal station quantity-control means for modifying the number to be recorded on the card to indicate a number of units purchased, the meter including means for registering a corresponding number of credits.

15. A system in accordance with claim 14, in which the quantity-control means adds digits representing the number of credits purchased to the first number (A) read from the card, the resulting number being used by the encryption means to obtain the second number (A'); and in which at the meter the modified second number (A') read from the card is decrypted and the added digits are used to register a corresponding number of credits while the remainder of the decrypted number is applied to the comparison means.

* * * * *